United States Patent [19]

Takada

[11] Patent Number: 4,470,141

[45] Date of Patent: Sep. 4, 1984

[54] MULTI-DIRECTION TIME DIVISION MULTIPLEX COMMUNICATION SYSTEM

[75] Inventor: Masami Takada, Tokyo, Japan

[73] Assignee: Nippon Electric Co., Ltd., Tokyo, Japan

[21] Appl. No.: 46,055

[22] Filed: Jun. 6, 1979

[30] Foreign Application Priority Data

Jun. 6, 1978 [JP] Japan ............................ 53/68581

[51] Int. Cl.³ .............................................. H04J 3/06
[52] U.S. Cl. ...................................... 370/104; 455/51
[58] Field of Search ........................ 370/104, 50, 100; 455/11, 12, 13, 51, 54; 375/107

[56] References Cited

U.S. PATENT DOCUMENTS

| | | | |
|---|---|---|---|
| 3,532,985 | 10/1970 | Glomb | 370/104 |
| 3,836,721 | 9/1974 | Sugioka | 370/104 |
| 4,117,267 | 9/1978 | Haberle | 370/104 |
| 4,129,755 | 12/1978 | Murakami | 370/104 |

Primary Examiner—Douglas W. Olms
Attorney, Agent, or Firm—Laff, Whitesel, Conte & Saret

[57] ABSTRACT

The inventive system includes a central station and a plurality of satellite stations which communicate on a time division multiplex basis. The central station generates frame synchronizing and clock signals, along with digital communication signals, which are suitably modulated into channel time slots. During its individually assigned channel time slot, each satellite station extracts the frame and clock signals and demodulates the communication signals which were directed to it. The extracted frame and clock signals are used in the satellite station to retime the communication signals which are sent in bursts of modulated carrier waves from the satellite stations to the central station. The central station demodulates the bursts of carrier waves to transmit the intelligence therein to its destination. The advantage is that many stations can share the same frequency and thereby make more efficient use of the transmission capacity.

8 Claims, 8 Drawing Figures

MULTI-DIRECTION TIME DIVISION MULTIPLEX COMMUNICATION SYSTEM

The invention relates to a multi-direction communication system extending between a central station and a plurality of satellite stations and, more particularly, to a digital multi-direction time division multiplex (MD-TDM) communication system.

A commonly used multi-direction communication system of this type is a multi-direction single side band (MD-SSB) communication system, as described in a paper entitled "UHF Band All-Solid-State Multidirection Radio Equipment" by Y. Miyata et al., NEC RESEARCH & DEVELOPMENT, No. 21, pp. 14 to 23, April 1971. The MD-SSB system is advantageous over the so-called opposite communication system in which transmitter/receiver units are installed one by one between a central station and each satellite station, because the MD-SSB system reduces the number of receivers in the central station and narrows the total frequency bandwidth assigned to the system.

Since the occupied bandwidth of the MD-SSB system is narrow, when it is used solely in a service zone, the frequency may be used effectively. The MD-SSB system, however, is susceptible to interference, with the communication performance depending largely on the amount of interference. For this, the service zone where a communication system is installed must be sufficiently separated from another service zone so that the interference is negligible when compared with the thermal noise, that is, the ratio (D/U) of a desired wave to an interference (or undesired) wave is 100 dB or more in a stationary state. Therefore, when the MD-SSB systems are installed in mutually adjacent service zones, those systems must use different frequencies to avoid the interference. This leads to the need for an increase of radio frequencies. While this communication system is well suited for the transmission of speech signals, it is not suited for the transmission of non-speech signals, as used in data communication or facsimile.

Another communication system for transmitting digital signals by a phase shift keyed carrier wave is insensitive to interference, with a low stationary D/U ratio which is improved by approximately 45 dB over the MD-SSB system. This indicates that communication lines or paths with the same frequencies may be installed with very little separation. Therefore, a plurality of the communication lines may be installed in a single service zone with a more efficient use of frequencies. This communication system is discussed in detail by an article "Small Capacity PCM Radio-Relay System", by K. Nishino et al., Japan Telecommunication Review, pp. 140 to 145, April 1977.

In a communication system improved over the above-mentioned systems, a single transmitter in a central station transmits to all the satellite stations a phase shift keying (TDM-PSK) wave which is phase-shifted by a time-division multiplex PCM (TDM-PCM) signal. On the other hand, each satellite station extracts the signal within a channel time slot assigned to the satellite station per se, and transmits a carrier radio wave to the central station. This radio wave contains a TDM-PSK wave, and has mutually different frequencies which are assigned to the satellite stations. In the central station, the received signals from the respective satellite stations are demodulated by a plurality of demodulators. The advantage of this communication system is that a plurality of communication systems with the same frequency-band (including different frequencies assigned to the multi-direction communication paths in each communication system) can be closely installed to each other.

The use of carrier waves with different frequencies, however, brings about disadvantages. One of them is the necessity for frequency guard bands between adjacent carrier waves, which guard one carrier wave from an interference by the adjacent carrier waves. Another disadvantage is that a plurality of demodulators must be provided. Thus, this communication system has not been put into practice, particularly due to the inefficiency in the frequency utilization.

For a satellite communication, the time division multiple access communication system (TDMA) is currently used in which a number of earth stations share the common carrier wave frequencies on the time division fashion. In the satellite communication system, the length of the propagation path between the earth stations varies as the satellite travels. This variation necessitates both the guard time slot provided between adjacent burst signals, and preamble codes for TDMA burst synchronization, timing recovery, and carrier recovery controls. For this reason, the information transmission efficiency is poorer than the continuous digital signal transmission. Additionally, the system is very complicated in construction and very costly to manufacture. This communication system is discussed in detail in U.S. Pat. Nos. 3,418,579 and 4,028,479, and in M. Takada et al. "New PCM-TDMA Satellite Communication System and Variable Destination Channel Control Technique", INTELSAT/IEE International Conference on Digital Satellite Communication, pp. 39–50, November 1969, and in W. Schrempp et al. "Unique Word Detection in Digital Burst Communications", IEEE Transactions on Communication Technology, Vol. COM-16, No. 4, pp. 597–605, August 1968.

Accordingly, an object of the invention is to provide a digital multidirection time division multiplex communication system with a high frequency utilization efficiency, simple construction and a low cost.

According to the invention, there is provided a multi-direction time division multiplex communication system for communication between a first station with a transmitter/receiver unit and a plurality of second stations, each with a transmitter/receiver unit. In the communication system, the transmitter of the first station has a first means for generating a frame synchronizing signal and a clock signal, a second means responsive to the frame synchronizing signal, the clock signal and a first digital signal, for arranging the frame synchronizing signal and the first digital in a first channel, in time-division multiplex fashion. A third means is responsive to a second digital signal for producing a continuously modulated carrier wave, and a fourth means transmits the continuously modulated carrier wave.

The receiver of the second station has a fifth means which is responsive to the continuously modulated carrier wave, for producing the second digital signal. A sixth means extracts the frame synchronizing and clock signals from the output signal of the fifth means. A seventh means is responsive to the extracted frame synchronizing signal for extracting from the second demodulated digital signal another digital signal within a time period assigned to the second station.

The transmitter of the second station has an eighth means which is responsive to the extracted frame synchronizing and clock signals for producing first and second timing signals. A ninth means is responsive to the first and second timing signals and a third digital signal for arranging the first timing signal and the third digital signal in a second channel, in time-division multiplex fashion to produce a fourth digital signal. A tenth means is responsive to the fourth digital signal for producing a burst modulated carrier wave, but only during a time period assigned to the second station by the first timing signal. An eleventh means delays the first and second timing signal so that the receiver of the first station receives, in time-division fashion and in a predetermined sequential order, a plurality of the burst modulated carrier waves with the same frequencies that are transmitted from the second transmitters.

The receiver of the first station has a twelfth means for demodulating the plurality of the bursts modulated carrier waves, thereby producing the plurality of the fourth digital signals. A thirteenth means is responsive to both the frame synchronizing signal and the clock signal from the first means for delaying at least these signals, thereby producing third and fourth timing signals. A fourteenth means uses the third and fourth timing signals to convert a plurality of the fourth digital signals which are demodulated into a fifth digital signal.

Other objects and features of the invention will be apparent from the following description taken in connection with the accompanying drawings, in which:

Figure 1:
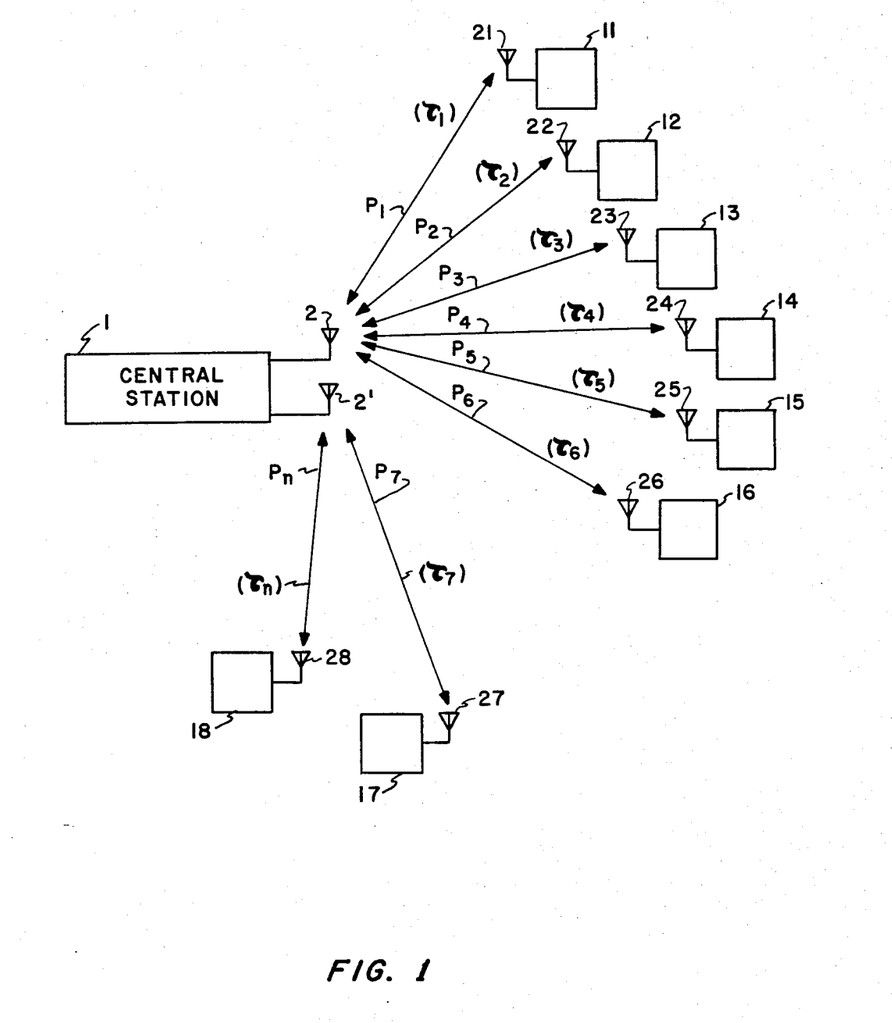
FIG. 1 schematically illustrates a digital multi-direction time-division communication system according to the invention.
Figure 2:
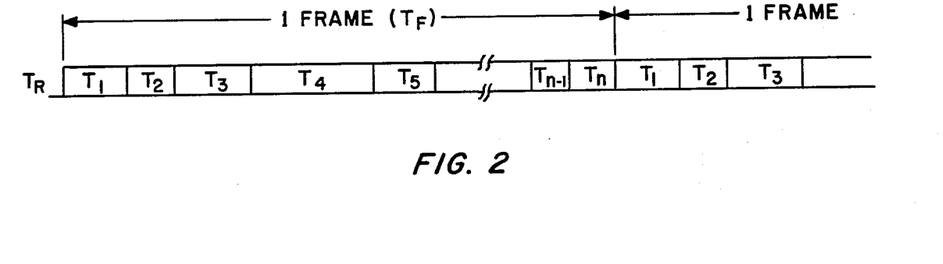
FIG. 2 shows a time chart for illustrating a signal transmitted from a central station to satellite stations in the communication systems shown in FIG. 1.

Reference is first made to FIG. 1 illustrating a digital multi-direction time-division communication system according to the invention. In the communication between a central station 1 and satellite stations 11 to 18, it is assumed that radio wave propagation or transmission paths P1 to Pn, linking the central station with satellite stations, are arranged with small angles therebetween or with wide directivity antennas. Therefore, only two antennas are used for the communication from the central station to the satellite stations 11 to 18; one denoted as "2" is used for the communication from the central station 1 to the satellite stations 11 to 16 and the other denoted as "2'" is used for the communication from the central station to the remaining satellite stations 17 and 18. As a matter of course, a single antenna can replace these two antennas 2 and 2'. The communication from the respective satellite stations 11 to 18 to the central station 1 uses individually associated antennas 21 to 28. A digital signal transmitted from the central station to the satellite stations is a digital multiplex communication signal with the well-known format as shown in FIG. 2. The signal format of the digital signal, in the case of a speech signal, employs the CCITT Recommendation G series (G732 to G752). Each satellite station 11 to 18 demodulates the carrier wave modulated by the digital signal $T_R$ including T1–Tn, thereby extracting the information signal from a time slot assigned to the satellite station, per se. The digital signal $T_R$ has a channel capacity $C_R$ and the transmission wave transmitted from the station 1 has the occupied bandwidth $f_{RD}$.

The signal transmitted from each satellite station is a burst signal, which is modulated by a digital signal signal under control of a clock frequency $F_{CR}$ included in the signal transmitted from the central station 1, as shown in FIGS. 3(a) to 3(h).

Assume now that the channel capacities in the communication paths from the central station 1 to the satellite stations 11 to 18 are equal to those Csa to Csh of the communication paths from the satellite stations to the central station. In addition, the digital signals Ta to Th have the channel capacities Cca to Csh, respectively. On this assumption, a burst signal Ta, corresponding to the channel capacity Csa, and a burst signal Th corresponding to the channel capacity Csh may be arranged sequentially within a frame length equal to the frame $T_F$ shown in FIG. 2, and as indicated by a signal Ts in FIG. 4. The total channel capacity is $C_R$. The signal Ts, in the form of a multiplication of the burst signals, has an occupied bandwidth $f_{SD}$ which is equal to an occupied bandwidth $f_{SD}$ of the digital signal $T_R$ in the central station 1.

Figure 4:
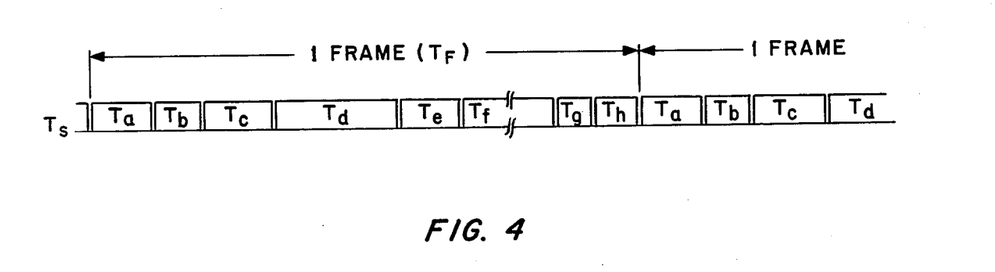
FIG. 4 shows a time chart similar to FIG. 2 for illustrating signals received by the receiver of the central station.

In the MD-TDM communication system according to the invention, the frame timings of a signal transmitted from the satellite stations 11 to 18 are timed by the frame signal included in the signal transmitted from the central station 1, in order that a signal received by the central station 1 will take the format as shown in FIG. 4.

In this case, the lengths of the propagation paths P1 to Pn are different, as shown in FIG. 1, thus they have different propagation times $\tau_1, \tau_2, ---$ and $\tau_n$. The burst TDM signals from the satellite stations 11 to 18 are arranged to form the reception signal of the central station 1 with the format as shown in FIG. 4, in the following manner.

Figure 5:
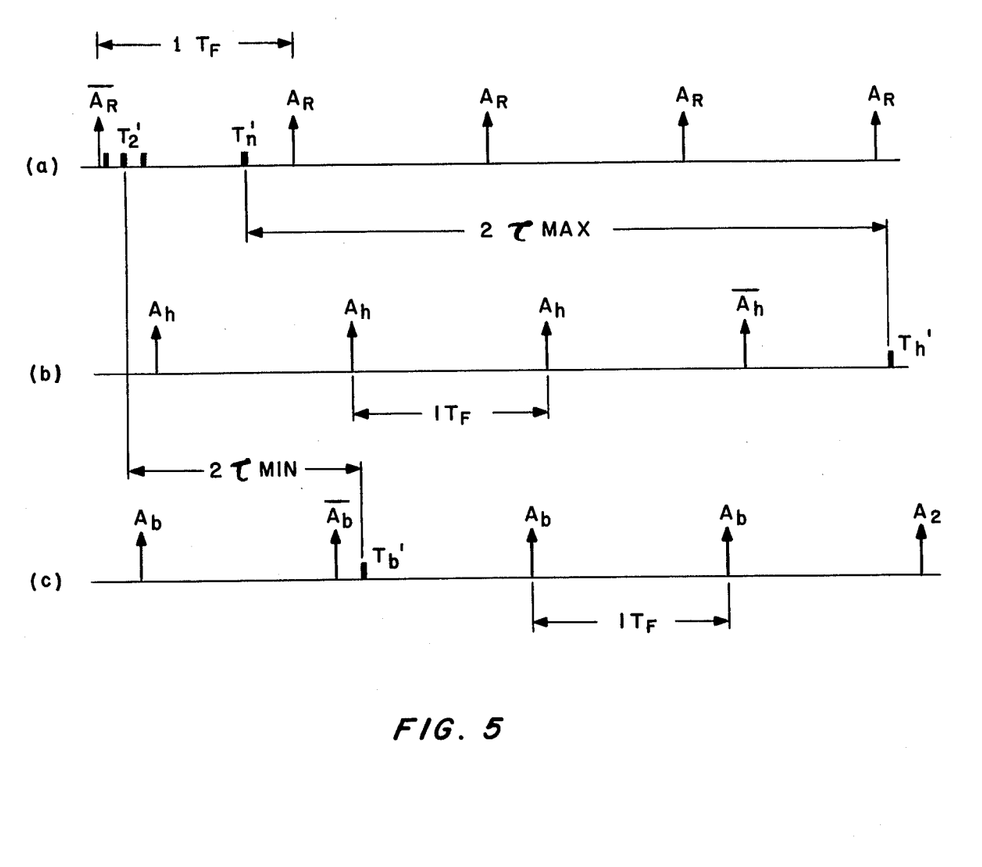
FIG. 5 shows a time chart for illustrating a frame synchronizing signal for explaining the principle of the present invention.

Assume now that the propagation time $\tau_2$ shown in FIG. 1 is the shortest propagation time $\tau_{min}$ and the propagation time $\tau_n$ is the longest propagation time $\tau_{max}$. In FIG. 5(a); illustrating a TDM signal transmitted from the central station 1, $A_R$ denotes frame synchronizing signals with periods $T_F$. Signal $\overline{A}_R$ is a frame synchronizing signal which is to be noticed for the currently proceeding explanation. The notations $T'_2$ and $T'_n$ are the front portions of the signals $T_2$ and $T_n$. FIG. 5(b) shows positions of TDM burst signals received by the central station 1 in a situation where, after $\tau_{max}$, the satellite station 18 receives the signal shown in FIG. 5(a), and transmits the TDM burst signal $T_h$ timed by the frame synchronizing signal included in the signal in FIG. 5(a). After $\tau_{max}$, the central station 1 receives the TDM burst signal. In the FIG. 5(b), $T'_h$ indicates the front portion of the burst signal $T_h$. The burst signal partly forms the receiving TDM signal $T_s$ of the central station 1. FIG. 5(c) shows positions of a TDM burst signal received by the central station 1 in a situation where, after $\tau_{min}$, the satellite station 12 receives the signal shown in FIG. 5(a) and transmits a TDM burst signal $T_b$ which is timed by the synchronizing signal. After $\tau_{min}$, the central station 1 receives the TDM burst signal. The notation $T'_b$ indicates the front portion of the burst signal $T_b$. Symbols $A_h$ and $A_b$ indicate the positions of the frame synchronizing signals included in the signals which are prepared and transmitted from the satellite stations 18 and 12 when they receive the signal shown in FIG. 5(a). Symbols $\overline{A}_h$ and $\overline{A}_b$ show the positions of the frame synchronizing signals shown in FIGS. 5(b) and 5(c) when the synchronizing signal $A_R$ is received by the central station 1 after the delays $2\tau_{max}$ and $2\tau_{min}$. The frame synchronizing signals AR of the TDM burst signals received by the satellite stations 11 to 18 distribute over the time intervals between the positions $\overline{A}_b$ and $\overline{A}_h$.

As described above, in order for central station 1 to arrange the signals transmitted from the satellite sations 11 to 18 into the format of the TDM signal as shown in FIG. 4 the frame synchronizing signals $A_a$ to $A_h$ must be accurately time-positioned to form the time reference for the TDM burst signals transmitted from the satellite stations 11 to 18. The frame synchronizing signals as shown in FIGS. 5(a) to 5(c) are periodically repeated with frame intervals $T_F$. In addition, the TDM burst signals are periodically repeated with frame intervals $T_F$.

Figure 3:
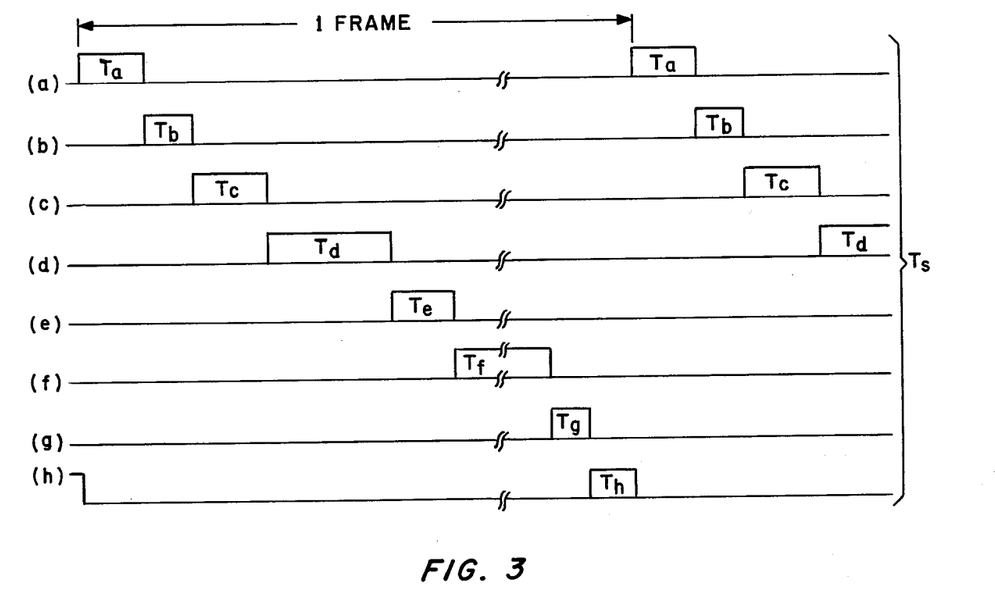
FIG. 3 shows a set of timing diagrams of signals transmitted from the satellite stations to the central station.

Accordingly, to accurately time-position the TDM burst signals, the time interval 0 to $\frac{1}{2} T_F$ is adequate for the difference between the propagation times in the communication paths $P_1$ to $P_n$. In other words, the receiving signals transmitted from the respective satellite stations, as shown in FIG. 3(a) to 3(h), may be arranged into the TDM format in a manner so that the satellite stations 11 to 18 respectively are provided with circuits capable of adjusting delay times to the maximum $\frac{1}{2} T_F$ in order to time-position signals $A_a$ to $A_h$ received by the central station 1. The TDM burst signals are transmitted after having passed those delay circuits in the satellite stations 11 to 18.

Additionally, the signals $T_a$ to $T_h$ shown in FIG. 4 must be coincidentally timed at the stations 1. To this end, the clock signal in the central station 1 is used for the clock signals of the signals transmitted from the satellite stations 11 to 18 and the signals are transmitted after having passed through delay circuits.

Figure 6:
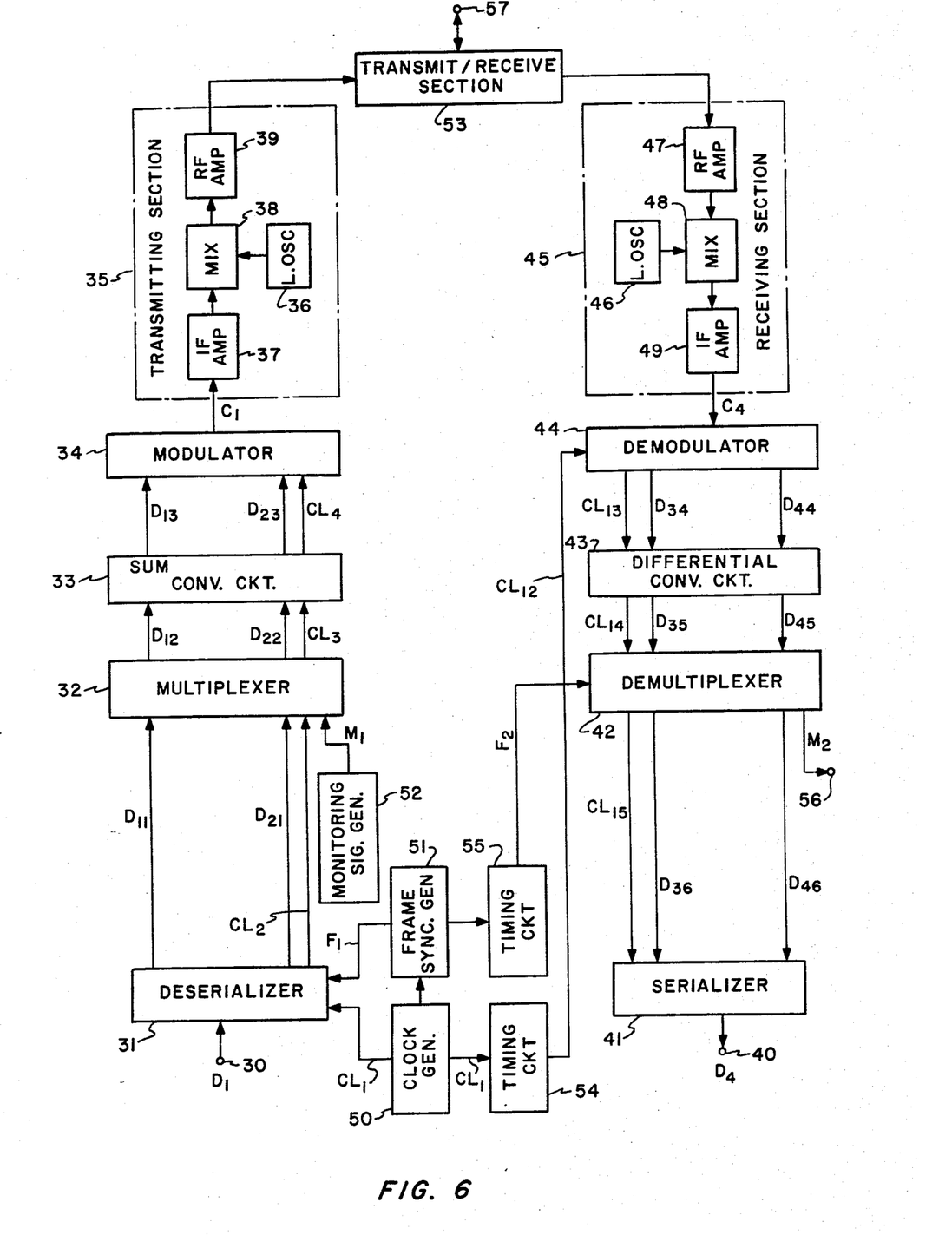
FIG. 6 shows a block diagram of the circuit of the central station.

The circuit constructions of the MD-TDM communication system according to the present invention will be described in detail with reference to FIGS. 6 and 7. As shown in FIG. 6, a transmitter in a central station 1 comprises a deserializer (or serial-to-parallel converter) 31, a multiplexer 32, a sum converting circuit 33, a modulator (for example, a known 4-phase PSK modulator) 34, a transmitting section 35, a clock signal generator 50, a frame synchronizing signal generator 51, a monitoring signal generator 52, and a transmit/receive section 53. A receiver in the central station 1 comprises a serializer (or parallel-to-serial converter) 41, a demultiplexer 42, a differential converting circuit 43, a demodulator circuit 44 (for example, a known delay or differential phase detector circuit, or a 4-phase synchronizing detector circuit), a receiving section 45, and timing signal generating circuits 54 and 55. The transmitting section 35 further comprises a local oscillator 36, a known intermediate frequency amplifier 37, a mixer 38 and an RF amplifier 39. The receiving sections 45 comprises a known local oscillator 46, an RF amplifier 47, a mixer 48 and an IF amplifier 49.

In operation, as it is received a TDM signal D1 appears at a terminal 30. The TDM signal D1 received is applied to the known deserializer, or serial-to-parallel converter, 31 where it is converted into two series of TDM signals D11 and D21 in response to the clock signal CL1 delivered from the clock signal generator 50. These signals D11 and D21 include a frame synchronizing signal F1 (for example, $\overline{AR}$ and AR shown in FIG. 5) delivered from the frame synchronizing signal generator 51. The converted signals D11 and D21 and a clock signal CL2 (with the same frequency as that of the clock signal CL1) are supplied to the multiplexer 32. The multiplexer 32 inserts a monitoring signal M1, from the monitoring signal generator 52, into the signals D11 and D21. The signals D12 and D22 and a clock signal CL3 (with a frequency higher than that of the clock signal CL2) are supplied to the sum converting circuit 33 which in turn produces signals D13 and D23. These signals D13 and D23 are applied to the modulator 34. In the modulator 34, a carrier wave is phase-modulated by the TDM signals D13 and D23. The PSK carrier wave is applied to a terminal 57, through the transmitting section 35 and the transmit/receive section 53. The terminal 57 is coupled with antennas 2 and 2' shown in FIG. 1.

On the other hand, PSK carrier waves (FIGS. 3(a) to 3(h)) transmitted from satellite stations 11 to 18 are received by the same antennas 2 and 2' in the form of a serially arranged format, as shown in FIG. 4. The received signal is applied to the demodulator 44, through the transmission/receiving section 53 and the reception section 45.

A delay detector with simple construction is preferable for the demodulator 44. A synchronizing detector may also be used for the demodulator 44. The demodulator 44 demodulates the PSK carrier waves into two serial TDM signals D34 and D44. These signals D34 and D44 are supplied to the differential converting circuit 43 to produce signals D35 and D45. The circuit 43 is controlled in its operation by a clock signal CL12 which is supplied from the timing circuit 54 (which may be the combination of a delay circuit, and an n1/m1 frequency multiplier/divider circuit, where n1 and m1 are integers or fractions). The clock signal CL12 is delayed from the clock signal CL1 and has the same frequency as that of the clock signal CL4. Alternatively, the clock signal CL4, from the converter 33, may be supplied through a delay circuit to the demodulator 44.

The demultiplexer 42 separates a monitoring signal M2 (to be described hereinafter) from the signals D35 and D45 with reference to the frame synchronizing signal F2, which is derived from the timing circuit 55 and which supplies the separated monitoring signal M2 to a terminal 56. The demultiplexer 42 also supplies the signals D36 and D46 to the serializer or parallel-to-serial converter 41.

The timing circuit 55 comprises the combination of a delay circuit and an n2/m2 frequency multiplier/divider circuit, where n2 and m2 are integers or fractions. The timing signal generating circuit 55 also generates the frame synchronizing signal F2 which is delayed from the synchronizing frame signal F1 and which has the same frequency as that of the frame synchronizing signal in the multiplexer 32. The maximum delay of the delay circuit in the timing signal generating circuit 55 is approximately $\frac{1}{2}T_F$, as previously stated. The serializer 41 converts the signals D36 and D46 into a serial TDM signal D4, in response to a clock signal CL14.

Figure 7:
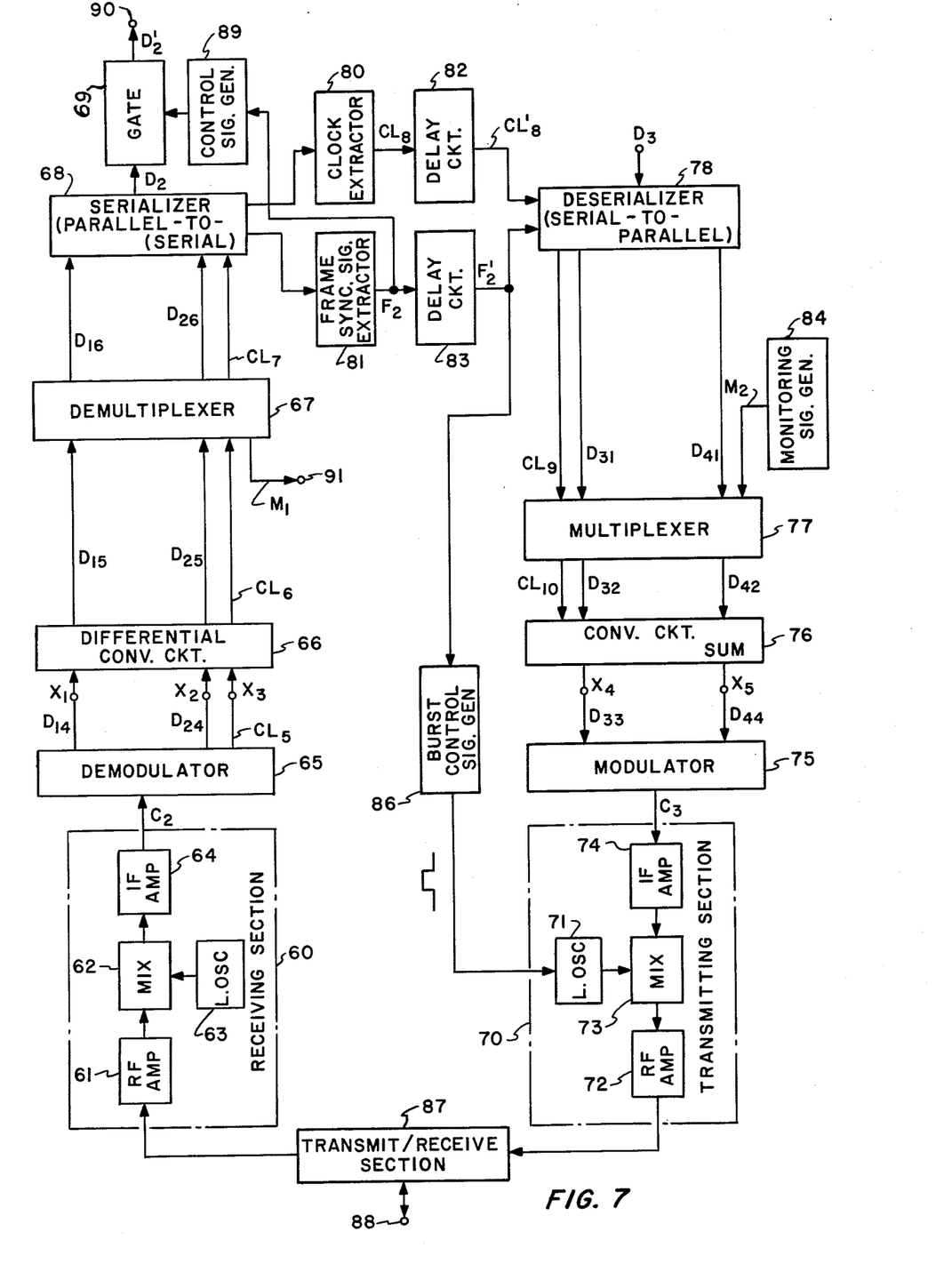
FIG. 7 shows a block diagram of the circuit of each satellite station.

As shown in FIG. 7, a receiver in each satellite station 11 to 18 comprises a transmit/receive section 87, a receiving section 60, a demodulator 65 (for example, a delay detector circuit or a synchronizing detector circuit), a differential converting circuit 66, a demultiplexer 67, a serializer (or parallel-to-serial converter) 68, a gate 69, a clock extractor 80, a frame synchronizing signal extractor 81 and a control signal generator 89.

A transmitter in each satellite station comprises a deserializer (or serial-to-parallel converting circuit) 78, a multiplexer 77, a sum converting circuit 76, a modulator 75, a transmitting section 70, delay circuits 82 and 83, a burst control signal generator 86 and a monitoring signal generator 84. The receiving section 60 comprises an RF amplifier 61, a mixer 62, a local oscillator 63 and an amplifier 64. The transmitting section 70 comprises a local oscillator 71, an RF amplifier 72, a mixer 73 and an IF amplifier 74.

In operation, a PSK carrier wave transmitted from the central station 1 (FIG. 1) is received by each satellite station 11 to 18 through its antenna 21 to 28. From there, it is applied through the transmit/receive section 87 (FIG. 7) to the receiving section 60, and demodulator 65. The demodulator 65 demodulates the received signal, to produce TDM signals D14 and D24, and a clock signal, CL5, which is equal to the clock signal CL4 (FIG. 6). These signals D14 and D24 (FIG. 7), and the clock signal CL5 are applied to the differential converting circuit 66 which in turn produces TDM signals D15 and D25 and a clock signal CL6. These signals correspond to the above-mentioned signals D12, D22 and CL3 (FIG. 6). The signals D15, D25 (FIG. 7) and CL6 are supplied to the demultiplexer 67.

Upon the receipt of the signals corresponding to the signals D11 and D21, the demultiplexer 67 separates them from a monitoring signal M1, appearing at the terminal 91, thereby producing TDM signals D16 and D26, and a clock signal CL7 (corresponding to the clock signal CL2). These signals D16, D26 (FIG. 7) and CL7 are applied to the serializer or parallel-to-serial converter 68 to produce a serial signal D2 corresponding to the signal D1 (FIG. 6).

The clock extractor 80 and a frame synchronizing signal extractor circuit 81, which may be of a known type, extract a clock signal CL8 and a frame synchronizing signal F2 from the serializer 68 which, respectively, correspond to the clock signal CL1 (FIG. 6) and the frame synchronizing signal F1. The signal F2 is supplied to the control signal generator 89 which may be the combination of a delay circuit and a monostable multivibrator, for example. The control signal generator 89 generates a signal for enabling the gate 69 to produce a TDM signal D'2, included in the signal D2, which is assigned to the station, per se.

The deserializer or serial-to-parallel converter 78 of the transmitter of each satellite station receives a clock signal CL8' and a frame synchronizing signal F2' after they have passed through the delay circuits 82 and 83, and also receives the TDM signal D3 during a time period assigned to the particular satellite station. The circuit 78 operates as the deserializer 31 (FIG. 6) operates in the central station producing two serial TDM signals D31 and D41 (including the frame synchronizing signal F2') and a clock signal CL9 (corresponding to the clock signal CL2).

The multiplexer 77 receives the signals D31 and D41, a monitoring signal M2 derived from the monitoring signal generator 84, and a clock signal CL9. Multiplexer 77 thereby produces TDM signals D32 and D42, (including the monitoring signal M2), and a clock signal CL10 (corresponding to the clock signal CL3). These signals are supplied to the sum converting circuit 76 to produce signals D33, D44 and CL11. The modulator 75 phase-modulates a carrier wave with the signals D33 and D44 for transmission to the transmitting section 70.

The PSK carrier wave C3 is converted into a radio frequency carrier wave by a signal generated from the local oscillator 71 and is sent out to the central station 1 through the transmit/receive section 87, the terminal 88, and the antennas 21 to 28. The local oscillator 71 is driven by the signal from the transmitter burst control signal generator (for example, a monostable multivibrator) 86 when only the station, per se, transmits and converts the PSK carrier wave C3 into burst PSK carrier wave Ta to Th, with the same frequencies as shown in FIG. 3(a) to 3(h). The generator 86 is driven by the frame synchronizing signal F2' which has passed through the delay circuit 83. In each satellite station, the delay circuit 83 is adjusted so that the burst signals in FIGS. 3(a) to 3(h) are received by the receiving section 45 in the central station in a continuous form as shown in FIG. 4. The maximum delay of the delay circuit 83 is approximately $\frac{1}{2} T_F$.

For further details of the multiplexer and demultiplexer shown in FIGS. 6 and 7, reference is made to the copending U.S. Patent Application Ser. No. 833,613 (corresponding German Patent Application Disclosure No. DE-OS No. 2741823), assigned to the present assignee. For the sum and differential converting circuits, reference is made to a paper "W-40G Clock Converters" by K. Nakagawa et al, Review of The Electrical Communication Laboratories, NTT, Japan, Volume 23, Nos. 7 to 8, July-August 1975, pages 799-817.

The description so far given is based on the assumption that the total channel capacity $C_R$ for transmission of the central station 1 to all satellite stations (FIG. 1) is equal to the total channel capacity $C_S$ for reception of the station 1 from all satellite stations. It also assumes that the occupied bandwidth $f_{RD}$ for transmission from the station 1 to all satellite stations is equal to that of $f_{SD}$ for reception of the station 1 from all satellite stations. However, the channel capacity for transmission from the central station to the satellite stations is rarely equal to that for transmission in the inverse direction, or reception from the satellite stations 11 to 18. Therefore, the invention may be applied directly in such a case, with minor modifications making the frame period or time length $T_F$ of the digital signal $T_R$ equal to that of another digital signal $T_S$ with different clock frequencies. For example, when the channel capacity $C_R$ for transmission of the central station 1 is larger than the total channel capacity $$C_S = \sum_{i=a}^{h} C_{Si}$$

where $C_{Si}$ is the channel capacity when i=a, ..., h) for reception of the central station 1, the deserializer 31 in the transmitter shown in FIG. 6 transmits a signal with the frequency of the clock CL1 corresponding to the channel capacity $C_R$. The frequency of the clock is applied to the receiver via a clock generator 50. It is set up at the demultiplied clock frequency up to the clock frequency substantially corresponding to the channel capacity $$\sum_{i=a}^{h} C_{Si}.$$

The frequency of the clock CL8 (FIG. 7), supplied from the circuit 68 through the clock extractor 80 to the circuit 78, is also divided at the same rate as that of the clock signal CL15 (FIG. 6). In this case, the occupied band width $f_{SD}$ is narrower than the width $f_{RD}$. That is, the channel capacity $C_R$ for transmission of the central station 1 differs from the total channel capacity $C_S$ for reception of the central station 1. However, in the telephone communication system, for example, generally the capacity $C_R$ is nearly equal to the capacity $C_S$. Accordingly, the clock signal $CL_2$ shown in FIG. 6 may be equal to the clock signal $CL_{15}$ shown in FIG. 6 and the $CL_7$ may be equal to the $CL_9$ shown in FIG. 7. In FIG. 7, the carrier wave of the burst signals transmitted from the satellite stations are different in frequency and phase when the modulator 75 are individually provided in the respective satellite stations. In the phase synchronizing detection, made by the demodulator 44 (FIG. 6) in the central station 1 (FIG. 1), it is common practice for the carrier wave to be recovered at the front portion of each burst signal and for the phase synchronizing detection to be carried out by using the recovered carrier wave. This operation is effected by using a well known circuit as disclosed in a paper entitled "The Design of a PSK MODEM for the TELESAT TDMA system" by S. Yokoyama, et al., ICC'75 Conference Record, pp. 44.11–44.15, June 1975.

The time necessary for recovering the carrier wave signal is approximately 300 ns. Accordingly, when the channel capacity is 6.3 Mb/s or less and the 4-phse PSK wave is used, the carrier recovery time falls within one symbol time slot so that the circuits 41 to 43 (FIG. 6) can treat the carrier signal as a continuous TDM signal. The clock is supplied from the circuit 50 in the transmitter, as mentioned previously, so that no recovery of it is necessary. In the case of a large channel capacity to the extent that the carrier recovery time is not so short that it falls within one symbol time slot, it is necessary to assign two or more symbol time slots to the carrier recovery. However, the use of the delay detection in place of the synchronizing detection may avoid the increase in the number of time slots because time slots are not necessary for carrier recovery.

When the CPFSK (coherent phase frequency shift keying) system is employed, the carrier recovery time slot is unnecessary. Incidentally, in the case of FSK, a discriminator is used for the demodulator. When the phase synchronizing detection is carried out, a circuit shown in FIG. 8 may be used in each of the satellite stations 11 to 18, in order to minimize the carrier wave recovery time. In this circuit, the frequency and the phase of the transmitting carrier wave are controlled by those of the received carrier wave. Before the transmission by the satellite station is carried out, the transmitting carrier waves from the satellite stations 11 to 18 are phase-adjusted to have the proper frequency and phase when received at the receiving input terminal 57 (FIG. 6) of the central station 1.

Figure 8:
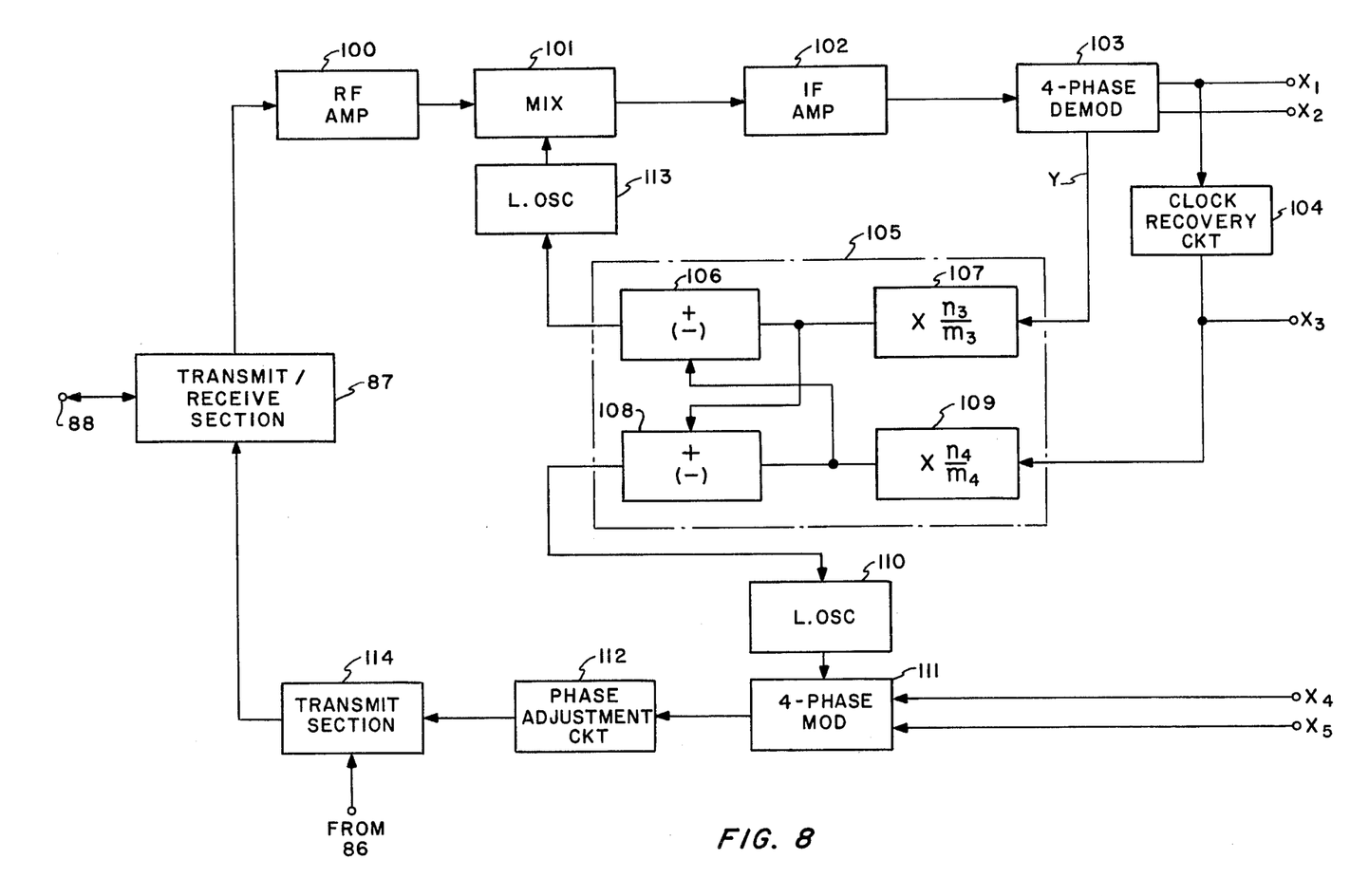
FIG. 8 shows a block diagram of a part of the circuit of the satellite station.

The circuit shown in FIG. 8 is inserted between the terminal 88 and the terminals X1 to X5 shown in FIG. 7. In FIG. 8, the circuit 87 and terminal 88 are those shown in FIG. 7. In FIG. 8, reference numeral 100 designates an RF amplifier; 101, a mixer; 102, an IF amplifier; 103, a 4-phase phase synchronizing detector; 104, a known clock recovery circuit; 105, a control signal generator; 106, an adder or subtractor 107, an n3/m3 frequency multiplier/divider device; 108, an adder or substractor; 109, an n4/m4 frequency multipler/divider device; 110 and 113, local oscillator 9 (for example, injection-locked oscillators); 111, a 4-phase phase modulator; 112, a phase adjusting circuit; and 114, a transmitting section comprising an RF AMP and a gate circuit controlled by the circuit 86 (FIG. 7). In those fractions, m3, n3 and n4 are integers or fractions.

In operation, a modulated carrier wave with the frequency $f_{RD}$, transmitted from the central station 1, is supplied to the terminal 88 in FIG. 8. The modulated carrier wave passes through the circuits 100 to 102 to reach the 4-phase synchronizing detector circuit 103 (such as a circuit 10 in FIG. 3 of U.S. Pat. No. 4,099,103). The outputs X1, X2 and Y of the detector 103 correspond to the terminals S11, S12 and the output of VCO17 in FIG. 3 in the same patent, respectively. The clock recovery circuit 104 reproduces the clock signal from the output X1 of the detector 103. This clock signal may be the clock signal derived from the circuit 80 shown in FIG. 7. The carrier wave signal produced from the detector circuit 103 and the clock signal are applied to the circuits 107 and 109, respectively. The outputs of those circuits 107 and 109 are supplied to the circuits 106 and 108. The circuits 106 and 108 produce signals to control the frequency and the phase of the signal generated from each of the transmitting and receiving local oscillators 113 and 110. In other words, those signals control the mixer 101 and the modulator 111 so that the frequency of the output signal derived from each of them is coincident with the frequency of the signal transmitted from the central station 1. The phase adjusting circuit 112 adjusts the phases of the carrier waves of the burst signals Ta to Th, which are received by the central station 1, by adjusting the phase of the output signal from the modulator circuit 111.

Assume that the receiving input carrier wave is expressed by $f_r$; the clock frequency of the receiving signal, by $f_T$; and the recovered carrier frequency, by $f_D$. Then, the intermediate frequency $f_{if}$, in the case of a single superheterodyne receiver, is equal to the recovered carrier frequency $f_D$ which is given by $$f_D = \frac{1}{(1 + l)} (f_r \pm nf_T).$$

As is obvious from the equation, the frequency and the phase of the recovered carrier wave are determined by the frequencies $f_r$ and $f_T$.

The circuit 105 is a combination of devices 107 and 109 controlled by the circuits 103 and 104, and adder or subtractor circuits 106 and 108. In the circuit 105, the recovered carrier wave and the clock signal are synthesized to produce control signals having frequencies which satisfy the above equation. The oscillators 113 and 110 are pulled into the output frequencies responsive to control signals from the circuits 106 and 108, respectively. The output of the receiving local oscillator is generally at a low level. Therefore, the oscillator 113 may be omitted when the output of circuit 106 is directly coupled with the mixer 101. Since the transmitting carrier wave has a high level, the oscillator 110 is controlled by the output of the circuit 108, and the output from the oscillator 110 is used as the transmitting carrier wave.

In addition to the single superheterodyne receiver (or transmitter), the present invention is applicable to a double superheterodyne receiver (or transmitter).

For the demodulation at the demodulator 44 (FIG. 6) in the central station 1, the phase adjustment of the carrier waves of the burst signals Ta to Th is not effective when the transmission paths are long and have a large variation of the phases, but is effective when the frequencies of the carrier waves are the same. This phase adjustment is more effective when the transmission paths are short and have little variation of the phases.

The digital MD-TDM communication system, according to the present invention described above, has many advantageous effects. For example, in an area where only one MD-SSB system may be installed, many digital MD-TDM systems may be installed and the utlitization efficiency of the frequency is increased several times compared to the conventional one. Unlike the conventional MD-SSB system for transmission of the speech sound, the digital MD-TDM system can transmit composite information signals such as facsimile, data, video and speech signals.

What is claimed is:

1. A multi-direction time division multiplex communication system for communication between a first station with a transmitter/receiver unit and a plurality of second stations, each with a transmitter/receiver unit, wherein:
   a. the transmitter of said first station comprises a first means for generating a frame synchronizing signal and a clock signal; a second means responsive to said frame synchronizing signal, to said clock signal and to a first digital signal for arranging said frame synchronizing signal and said first digital signal in a first channel in a time-division multiplex format; a third means responsive to a second digital signal for producing a continuous modulated carrier wave; and a fourth means for transmitting said continuous modulated carrier wave;
   b. the receiver of each of said second stations comprising a fifth means responsive to said continuous modulated carrier wave for producing said second digital signal; a sixth means for extracting said frame synchronizing and clock signals from the output signal of said fifth means; and a seventh means responsive to the extracted frame synchronizing signal for separating a digital signal within a time period assigned to said second station, said digital signal being separated from the second digital signal and demodulated;
   c. the transmitter of each of said second stations comprises an eighth means responsive to the extracted frame synchronizing and clock signals for producing first and second timing signals; a ninth means responsive to said first and second timing signals and responsive to a third digital signal for arranging said first timing signal and said third digital signal in a second channel in time-division multiplex format, thereby producing a fourth digital signal; a tenth means responsive to said fourth digital signal for producing a burst modulated carrier wave during only a time period assigned to said second station by said first timing signal; and an eleventh means for delaying said first timing signal so that the receiver of said first station receives, in a time-division multiplex format and in a predetermined sequential order, a plurality of the burst modulated carrier waves having the same frequencies that are transmitted from transmitters of said second stations; and
   d. the receiver of said first station comprises a twelfth means for demodulating the burst modulated carrier waves from said plurality of second stations to produce the plurality of said fourth digital signals; a thirteenth means responsive to both the frame synchronizing signal and the clock signal from said first means for delaying at least these signals to produce third and fourth timing signals; and a fourteenth means for converting a plurality of the demodulated fourth digital signals into a fifth digital signal responsive to said third and fourth timing signals.

2. A multi-direction time division multiplex communication system as claimed in claim 1, wherein said eleventh and thirteenth means include delay circuit means for delaying said first timing signal and said frame synchronizing signals up to approximately one half of the period of the frame synchronizing signal, respectively.

3. A multi-direction time division multiplex communication system for communication between a first station with a transmitter/receiver unit and a plurality of second stations, each with a transmitter/receiver unit, wherein:
   a. the transmitter of said first station comprises a first means for generating a frame synchronizing signal and a clock signal; a second means responsive to said frame synchronizing signal, to said clock signal and to a first digital signal for arranging said frame synchronizing signal and said first digital signal in a first channel in a time-division multiplex format; a third means responsive to a second digital signal for producing a continuous modulated carrier wave; and a fourth means for transmitting said continuous modulated carrier wave;
   b. the receiver of each of said second stations comprising a fifth means responsive to said continuous modulated carrier wave for producing said second digital signal; said fifth means including a synchronizing detector circuit means with a carrier wave recovering means for demodulating the continuous modulated carrier wave into said second digital signal; a sixth means for extracting said frame synchronizing and clock signals from the output signal of said fifth means; and a seventh means responsive to the extracted frame synchronizing signal for separating a digital signal within a time period assigned to said second station, said digital signal being separated from the second digital signal and demodulated;
   c. the transmitter of each of said second stations comprises an eighth means responsive to the extracted frame synchronizing and clock signals for producing first and second timing signals; a ninth means responsive to said first and second timing signals and responsive to a third digital signal for arranging said first timing signal and said third digital signal in a second channel in time-division multiplex format, thereby producing a fourth digital signal; a tenth means responsive to said fourth digital signal for producing a burst modulated carrier wave during only a time period assigned to said second station by said first timing signal; and an eleventh means for delaying said first timing signal so that the receiver of said first station receives, in a time-division multiplex format and in a predetermined sequential order, a plurality of the burst modulated carrier waves having the same frequencies that are transmitted from transmitters of said second stations; and d. the receiver of said first station comprises a twelfth means for demodulating the burst modulated carrier waves from said plurality of second stations to produce the plurality of said fourth digital signals; a thirteenth means responsive to both the frame synchronizing signal and the clock signal from said first means for delaying at least these signals to produce third and fourth timing signals; and a fourteenth means for converting a plurality of the demodulated fourth digital signals into a fifth digital signal responsive to said third and fourth timing signals;

e. said second station further comprises a fifteenth means for frequency-multiplying and dividing the recovered carrier wave derived from said fifth means and the clock signal extracted from said sixth means to produce first and second control signals; a sixteenth means for synthesizing said first and second control signals to produce third and fourth control signals; and a seventeenth means for controlling the frequency and the phase of said continuous modulated carrier wave and said burst modulated carrier wave by said third and fourth control signals.

4. A multi-direction time division multiplex communication system comprising a central station and a plurality of satellite stations; means in said central station for transmitting continuously modulated signals having time slots which are individually assigned to each of said satellite stations, each of said time slot signals including frame, clock and first digital intelligence signals; means in each of said satellite stations effective during its individually assigned time slot for separating said frame and clock signals from said continuously modulated signals; means in each of said satellite stations, responsive to said separated signals for retiming and transmitting second digital intelligence signals in the form of bursts of modulated carrier waves, all of said carrier waves having the same frequency; means in said central station for delaying at least said frame and clock signals; and means in said central stations, responsive to the delayed frame and clock signals for reproducing said second digital intelligence signals from said bursts of carrier waves.

5. The system of claim 4 wherein said central station has a plurality of antennas, each of said antennas being for communicating with a different plurality of said satellite stations.

6. The system of claim 4 wherein communication paths between said central station and each of said satellite stations may have a different propagation time, and means in said satellite stations for adjusting said retiming as a function of the different propagation times.

7. The system of claim 4 wherein said modulated carrier wave is a phase shifted time division multiplex carrier wave.

8. The system of claim 4 wherein said retiming means includes a delay circuit means for delaying signals up to approximately one-half of a frame.

* * * * *